United States Patent
Vossen

(10) Patent No.: US 11,457,067 B2
(45) Date of Patent: Sep. 27, 2022

(54) SYSTEM COMPRISING VEHICLE KEYS AND A DOCKING STATION, RESPECTIVE VEHICLE KEY, DOCKING STATION, METHOD AND COMPUTER PROGRAM

(71) Applicant: INTERDIGITAL CE PATENT HOLDINGS, SAS, Paris (FR)

(72) Inventor: Danny Vossen, Edegem (BE)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 98 days.

(21) Appl. No.: 15/268,585

(22) Filed: Sep. 17, 2016

(65) Prior Publication Data

US 2017/0085643 A1 Mar. 23, 2017

(30) Foreign Application Priority Data

Sep. 17, 2015 (EP) .................................. 15306430

(51) Int. Cl.
| | |
|---|---|
| H04L 67/1095 | (2022.01) |
| G07C 5/08 | (2006.01) |
| G07C 9/00 | (2020.01) |
| H04L 67/12 | (2022.01) |
| B60R 25/24 | (2013.01) |
| B60R 25/102 | (2013.01) |
| G06F 1/16 | (2006.01) |

(Continued)

(52) U.S. Cl.
CPC ........ *H04L 67/1095* (2013.01); *G07C 5/0858* (2013.01); *G07C 9/00174* (2013.01); *H04L 67/12* (2013.01)

(58) Field of Classification Search
CPC ..... H04L 67/1095; H04L 67/12; H04L 67/34; H04L 69/26; H04L 67/00; H04L 69/00; G07C 5/0858; G07C 9/00174; G07C 9/00309; G07C 9/00; B60R 25/24; B60R 25/102; G06F 1/1632; G06F 1/16
USPC ........................................................ 709/223
See application file for complete search history.

(56) References Cited

U.S. PATENT DOCUMENTS

| | | | |
|---|---|---|---|
| 5,838,251 | A | 11/1998 | Brinkmeyer et al. |
| 7,394,353 | B2 | 7/2008 | Schambeck et al. |

(Continued)

FOREIGN PATENT DOCUMENTS

| | | |
|---|---|---|
| CA | 2645642 | 5/2010 |
| DE | 102004006734 A | 9/2005 |

(Continued)

*Primary Examiner* — Anh Nguyen
*Assistant Examiner* — Tony Williams
(74) *Attorney, Agent, or Firm* — Jerome G. Schaefer

(57) ABSTRACT

A system having vehicle keys and a docking station, wherein each vehicle key has a node for connecting with a vehicle and with the docking station. The docking station includes ports for accommodating the vehicle keys, a first node for connecting with the vehicle keys and a second node for connecting with a processor system. A first of the vehicle keys is assigned to a first vehicle and includes a discovery protocol for detecting a second vehicle key assigned to the first vehicle when the first and the second vehicle keys are put in the ports of the docking station. Vehicle system data stored in each of the first vehicle key and the second vehicle key is synchronized between the first vehicle key and the second vehicle key while connected to the ports of the docking station.

11 Claims, 2 Drawing Sheets

(51) Int. Cl.
*H04L 67/00* (2022.01)
*H04L 69/00* (2022.01)

(56) References Cited

U.S. PATENT DOCUMENTS

| | | | |
|---|---|---|---|
| 7,543,755 B2 | 6/2009 | Doi et al. | |
| 2002/0024427 A1* | 2/2002 | Banas | B60R 25/246 340/425.5 |
| 2003/0231550 A1* | 12/2003 | Macfarlane | B60R 25/257 367/198 |
| 2004/0230348 A1 | 11/2004 | Mann et al. | |
| 2006/0049922 A1* | 3/2006 | Kolpasky | B60R 25/33 340/426.13 |
| 2006/0155439 A1 | 7/2006 | Slawinski et al. | |
| 2008/0201753 A1 | 8/2008 | Arling et al. | |
| 2009/0224876 A1* | 9/2009 | McCall | B60R 25/2009 340/5.61 |
| 2010/0171642 A1* | 7/2010 | Hassan | G01C 17/38 340/992 |
| 2010/0253535 A1* | 10/2010 | Thomas | H04B 1/082 340/4.37 |
| 2010/0304690 A1* | 12/2010 | Proefke | B60R 25/24 455/69 |
| 2012/0109446 A1* | 5/2012 | Yousefi | H04N 7/183 701/29.3 |
| 2013/0151111 A1* | 6/2013 | Skelton | B60R 16/02 701/99 |
| 2014/0091903 A1* | 4/2014 | Birkel | G07C 9/20 340/5.54 |
| 2014/0266580 A1* | 9/2014 | Lopez | G07C 9/00571 340/5.6 |
| 2014/0277837 A1* | 9/2014 | Hatton | G07C 9/00309 701/2 |
| 2014/0310031 A1* | 10/2014 | Ricci | G06Q 30/0265 705/5 |
| 2015/0061828 A1 | 3/2015 | Fischer et al. | |
| 2015/0148989 A1* | 5/2015 | Cooper | B60R 16/037 701/2 |

FOREIGN PATENT DOCUMENTS

| | | | | |
|---|---|---|---|---|
| DE | 102004006734 A1 * | 9/2005 | | B60R 25/24 |
| JP | 2009031886 A * | 2/2009 | | |
| JP | 2009031886 A | 2/2009 | | |
| JP | 2009271866 A | 11/2009 | | |
| JP | 2010127166 A | 6/2010 | | |
| WO | WO2010036228 | 4/2010 | | |

* cited by examiner

SYSTEM COMPRISING VEHICLE KEYS AND A DOCKING STATION, RESPECTIVE VEHICLE KEY, DOCKING STATION, METHOD AND COMPUTER PROGRAM

This application claims the benefit, under 35 U.S.C. § 119 of European Patent Application No. 15306430.8, filed Sep. 17, 2015.

TECHNICAL FIELD

The present disclosure relates to the field of vehicle key systems, in particular to wireless vehicle key systems.

BACKGROUND

Vehicle keys are used to lock and unlock the doors of a vehicle and start its engine. By using a contactless technology, modern vehicle keys can lock and unlock the doors also from a distance. But future vehicle keys will include more and more functions, it is proposed to include for example near field communication (NFC) technology and smartphone functions.

The BMW Cooperation proposes to use NFC in a vehicle key, which could be used for example to make payments, store information in the vehicle key and access to hotel rooms. BMW vehicle keys as used for the car BMW I8 store in addition service data and control data of the vehicle and use a display to show the remaining range of the vehicle.

US 2015/0061828 of BMW describes an intermediary access device enabling a user electronic device to communicate with a vehicle's onboard computer system. User commands and vehicle information can be transmitted between the vehicle on-board computer system and the user electronic device via the intermediary access device. The user electronic device is for example a smartphone or a similar electronic device communicating via a near field technology with the on-board computer system.

US 2006/0155439 A1 discloses a vehicle key system and a method for collecting, storing, interpreting and transmitting data from vehicles of all kinds allowing vehicle users and fleet managers to diagnose problems by using the vehicle key system. Via a vehicle key of the system, vehicle feature settings can be stored and transmitted to a PC to analyze vehicle operating data. The system may include further a docking station which holds multiple vehicle keys, downloads and uploads vehicle key data via the PC, and monitors the physical presence of the vehicle keys.

SUMMARY

A system comprises vehicle keys and a docking station, wherein each vehicle key comprises a node for connecting with a vehicle and with the docking station,
the docking station comprises ports for accommodating the vehicle keys, and at least a first node for connecting with the vehicle keys and
a first of the vehicle keys is assigned to a first vehicle and is configured to detect a second vehicle key assigned to the first vehicle, when the first and the second vehicle keys connected to the the ports of the docking station.

The first and the second vehicle keys are advantageously configured to synchronize vehicle system data being stored in each of the first and second vehicle keys, when both are placed in ports of the docking station, to update the vehicle system data of each of the first and second vehicle keys to the most recent version of the vehicle system data.

The vehicle keys comprise in particular a memory for storing identification data, audio/video data and the vehicle system data, and wherein the identification data identify a user of one of the vehicle keys to the processor system and to a vehicle assigned to the one of the vehicle keys.

A vehicle key comprises a processor, a memory, in which a discovery protocol is stored for detecting a second vehicle key of a same vehicle, when both vehicle keys connected to ports of the docking station, and a wired or a wireless node for connecting with the vehicle and with the docking station. The vehicle key is in particular configured to synchronize vehicle system data being stored in its memory with the second vehicle key, when both are placed in ports of the docking station, to update the vehicle system data of each of both vehicle keys to the most recent version of the vehicle system data.

The docking station comprises in particular in addition a processor and a memory.

A method for synchronizing vehicle system data between a first and a second vehicle key of a vehicle, wherein each vehicle key comprises a wireless node for connecting with the vehicle and with the docking station, comprises: the vehicle keys detecting each other and synchronizing vehicle system data of the car, to update the vehicle system data of each of the first and second vehicle keys to the most recent version of the vehicle system data, when both are placed in ports of the docking station.

A computer program comprises executable program code for performing the method.

A non-transitory program storage medium, readable by a processor, comprises executable program code for performing the method.

BRIEF DESCRIPTION OF THE DRAWINGS

Exemplary embodiments of the present disclosure are explained in more detail below by way of example with reference to schematic drawings, which show.

Figure 1:
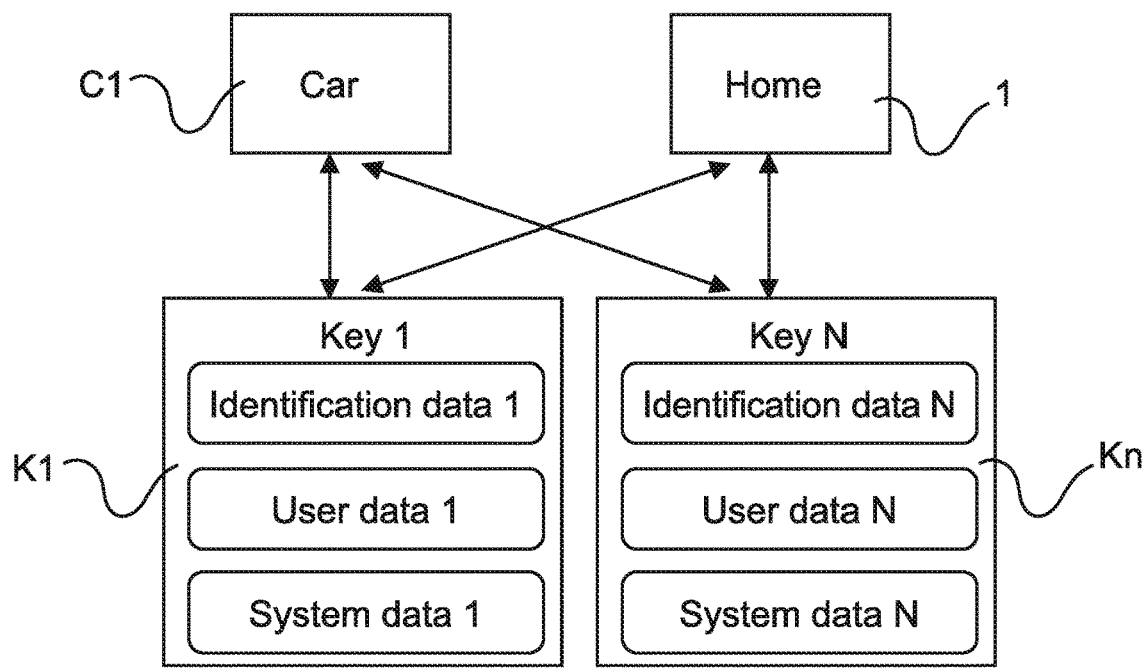
FIG. 1 a system comprising vehicle keys.

It should be understood that the drawings are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, non-limiting embodiments for a system comprising vehicle keys and a docking station are described. Each vehicle key comprises a wireless node for operating a vehicle and the docking station comprises at least one wired or wireless node for connecting the docking station with one of the vehicle keys and with a home network. Under vehicle it is understood in this context for example any car, truck, bus or motorcycle being operated by a vehicle key. The vehicle keys are in particular electronic devices for keyless car entry systems.

In a preferred embodiment, depicted in FIG. 1, the system comprises a multitude of vehicle keys K1-Kn, which are designed for driving at least one vehicle, e.g. vehicle C1. Via the wireless node included in each vehicle key K1-Kn, it is further possible to control devices in a home network 1 or to perform an operation in the home network 1. Each of the vehicle keys K1-Kn comprises a processor and a memory, in which vehicle system data, identification data of a user and user data are stored. The user data are for example video or audio data to be rendered in the vehicle C1. The vehicle system data, the identification data and the user data are stored in the vehicle keys K1-Kn for example by any user of the vehicle C1, the vehicle C1 or by using any device of the home network 1.

The vehicle keys K1-Kn can be used in particular as a repository for system data of the vehicle C1 and data the home network 1 for a variety of use cases. The vehicle system data, the user data and the identification data of each vehicle key K1-Kn can be made available within the vehicle C1 as well as in the home network 1, so that the data can be used in respective applications and services for a better user experience. The vehicle system data, the user data and the identification data can be transferred between the keys K1-Kn and the vehicle C1 and between the home network 1 and the vehicle keys K1-Kn. The vehicle system data of a vehicle include for example mileage, service interval, fuel level, error messages, tire pressure, etc.

Via the wireless node included in each of the vehicle keys K1-Kn, it is further possible to use the vehicle keys as a unified key for access and identification not only for a vehicle, but also as a key for the home, office and other locations, when these are equipped with a respective wireless access system.

Figure 2:
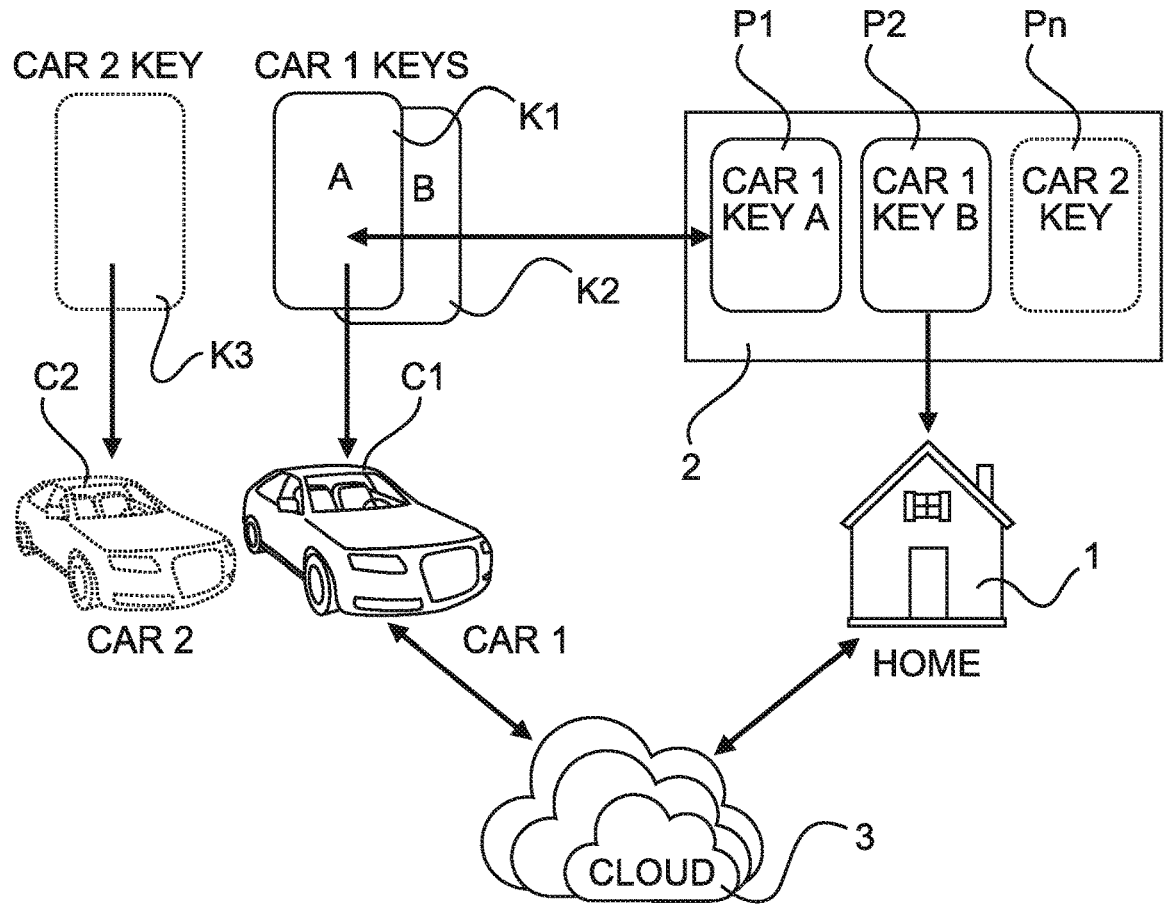
FIG. 2 a system comprising vehicle keys, vehicles and a docking station.

An embodiment of the system of FIG. 1 is depicted in FIG. 2. For transferring user data, vehicle system data and identification data between the home network 1 and the vehicle keys K1-Kn, the system includes a docking station 2. The docking station 2 is connected with the home network 1 via a wired or a wireless connection and includes several ports P1-Pn. The ports P1-Pn are designed to accommodate the vehicle keys K1-Kn. When one of the vehicle keys K1-Kn is placed in one of the ports P1-Pn, a data transmission between that vehicle key and the home network 1 is possible via the docking station 2. The data transmission is provided via a wired or a wireless node included in each vehicle key K1-Kn and a wired or a wireless node included in each of the ports P1-Pn. The docking station 2 comprises in addition a wired or a wireless node for connecting with the home network 1. Each port P1-Pn is further adapted to provide a charging of a battery included in each vehicle key K1-Kn. The vehicle keys K1-Kn are adapted to operate with a respective vehicle, e.g. one of the cars C1, C2.

Via the home network 1, it is further possible to connect with a service provider network 3 to store any user data, vehicle system data and/or identification data of each of the vehicle keys K1-Kn in the service provider network 3. Each of the vehicles may be further adapted to connect directly with the service provider network 3 via a wireless transmission, for example via a mobile phone connection, for a backup and restore of the vehicle system data, the user data and the identification data.

Each of the vehicle keys K1-Kn includes a discovery protocol for detecting another key of the same vehicle, when placed in one of the ports P1-Pn of the docking station 2. The docking station 2 includes in particular a processor and a memory for operating the wired and/or wireless nodes of the docking station 2, and to support a synchronization of vehicle system data between vehicle keys of the same vehicle. Each vehicle key K1-Kn includes further advantageously a display, for example an LCD screen, to display relevant vehicle system data, for example fuel level and/or remaining range.

The car C1 for example can be driven with the vehicle keys K1 and K2. When both vehicle keys K1 and K2 are placed in ports of the docking station 2, e.g. ports P1 and P2, the vehicle key K1 detects the presence of the vehicle key K2 and vehicle key K2 detects the presence of the vehicle key K1, and in that case, vehicle system data are synchronized between the vehicle keys K1 and K2 to update the vehicle system data, so that each of the vehicle keys K1, K2 includes the actual vehicle system data. For example, the car C1 is mostly used by a first user using vehicle key K1 for driving the car C1. Occasionally, also a second user uses the car C1 by using the vehicle key K2. Because the vehicle system data of the car C1 are always updated between the vehicle keys K1 and K2 via the docking station 2, the second user is each time informed via the display of the vehicle key K2 about the actual vehicle system data of the car C1, when he takes the vehicle key K2 from the docking station 2 for driving the car C1.

The vehicle system data may be synchronized also between two vehicle keys via the service provider network 3, when one of the vehicle keys is used with a vehicle and the other one is placed in the docking station 2. For example, the first user is on the road with the car C1 using the vehicle key K1. Via the wireless connection between the car C1 and the service provider network 3 and the connection of the service provider network 3 with the docking station 2, the system data of the car C1 are provided to the docking station 2 for synchronization, to update the vehicle system data of the vehicle key K2 being connected with the docking station 2, so that the vehicle key K2 stores always the most recent vehicle system data of the car C1 and can display respective information on its display.

Figure 3:
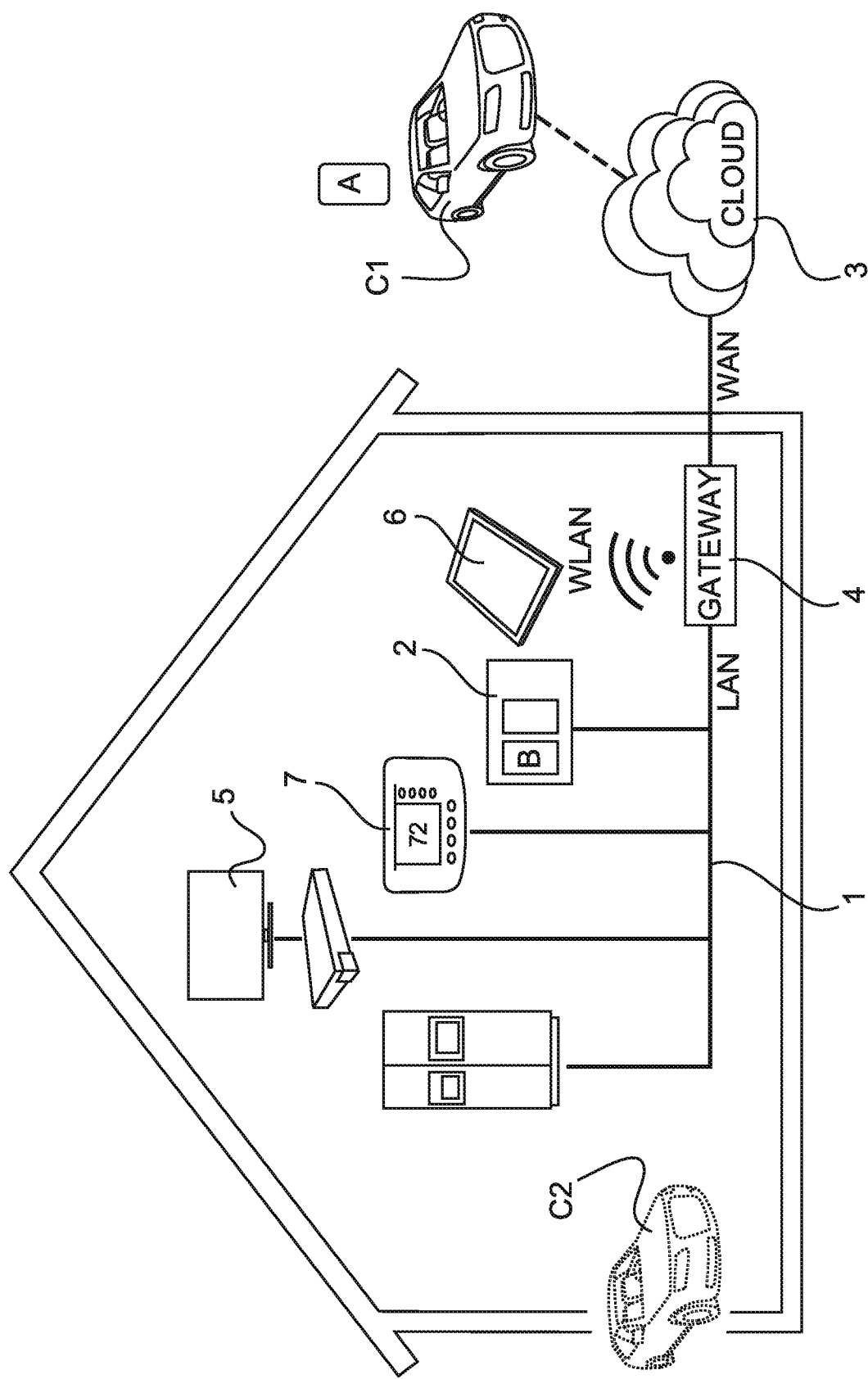
FIG. 3 the system of FIG. 2, wherein the docking station is integrated within a home network.

The home network 1 is illustrated in more detail in FIG. 3. The home network 1 includes an access gateway 4, via which a broadband connection with the service provider network 3 is provided. The service provider 3 is in particular an Internet service provider being located in the Internet. Via a cell network connection, a direct data transmission is also possible between the vehicle C1 and the service provider network 3, as described with regard to FIG. 2. To the access gateway 4, the docking station 2 is coupled, and also other devices of a home of a user, for example a television set 5, a notebook or a tablet PC 6, and a heating system 7.

The docking station 2 is mounted for example on a wall in a corridor close to a main entrance of the home, so that a safe storage for each vehicle key K1-Kn is provided. A user can deposit his vehicle key therefore immediately in the docking station 2, when he enters his home.

Via the access gateway 4, audio and video data from the tablet PC 6 and from other audio and video devices can be stored on the vehicle keys K1-Kn, when placed in the docking station 2. When one of the vehicle keys K1-Kn is inserted in the docking station 2, the vehicle key has access to the home network 1 and data can be synchronized with any other vehicle key, or with other devices of the home network 1, and audio and video data can be uploaded on the vehicle key. Via the service provider network 3, vehicle data can be provided also to any service station for vehicle services.

Although embodiments which incorporate the teachings of the present disclosure have been shown and described in detail herein, those skilled in the art can readily devise many other varied embodiments that still incorporate these teachings. Having described preferred embodiments (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

The invention claimed is:

1. A system comprising:
at least two vehicle keys, each of the vehicle keys comprising a node for connecting with a vehicle and with a docking station, each vehicle key comprising an electronic device; and
a docking station connected to a network of a home or an enterprise, the network of the home or enterprise connected to a service provider network, the docking station comprising physical ports for accommodating the vehicle keys, each of the physical ports including a node for connecting the docking station with one of the vehicle keys when placed in a physical port;
wherein a first of the vehicle keys and a second of the vehicle keys are assigned to a vehicle, wherein when the first key is located in the vehicle, system data are provided to the docking station using a wireless connection between the vehicle and the service provider network;
the first and the second vehicle keys are configured to synchronize vehicle system data via the service provider network when the first vehicle key is used in the vehicle and the second vehicle key is connected to a port of the docking station, wherein synchronizing vehicle system data acts to update the vehicle system data of the second vehicle key to the vehicle system data in the first vehicle key.

2. The system of claim 1, further configured to accommodate inserting the first vehicle key and the second vehicle key into the physical ports of the docking station, wherein by means of a discovery protocol, the presence of the other vehicle key is detected when the first vehicle key and the second vehicle key are connected to the physical ports of the docking station, wherein vehicle system data stored in each of the first vehicle key and the second vehicle key is synchronized to update the vehicle system data of each of the first vehicle key and second vehicle key to the most recent version of the vehicle system data.

3. The system of claim 2, wherein each vehicle key is configured to synchronize its vehicle system data with a processor system connected to the docking station, when a respective vehicle key is connected to a port of the docking station.

4. The system of claim 1, wherein each vehicle key is configured to connect with the service provider network for a backup of its vehicle system data.

5. The system of claim 1, wherein the vehicle keys comprise a memory for storing vehicle system data, identification data and audio/video data, and wherein the identification data identify a user of one of the vehicle keys to a processor system and to a vehicle assigned to the one of the vehicle keys.

6. The system of claim 1, wherein each port of the docking station includes a cavity for housing of one of the vehicle keys.

7. The system of claim 3, wherein the processor system is a computer of the network of the home or the enterprise.

8. The system of claim 2, wherein vehicle system data stored in each of the first vehicle key and the second vehicle key is synchronized between the first vehicle key and the second vehicle key while connected to the physical ports of the docking station includes synchronization of one or more of identification data of a user, and user data.

9. A method for synchronizing of vehicle system data between a first vehicle key and a second vehicle key for a vehicle, each vehicle key comprising an electronic device having a node for connecting with a docking station and with the vehicle, the method comprising:

establishing a wireless connection between the vehicle and a service provider network, the first vehicle key used in the vehicle and containing vehicle system data;

connecting the second vehicle key to a physical port in a docking station connected to a network of a home or enterprise, the network of the home or enterprise connected to the service provider network;

synchronizing vehicle system data between the first vehicle key and the second vehicle key, wherein the vehicle system data is provided to the docking station via the connected service provider network to update the vehicle system data of the second vehicle key.

10. The method of claim 9, further comprising:

each vehicle key synchronizing vehicle system data with a processor system connected to the docking station and the network of the home or enterprise.

11. The method of claim 9, further comprising:

connecting the second vehicle key to the docking station with the service provider network for a backup of vehicle system data.

\* \* \* \* \*